United States Patent

Huloux

[11] Patent Number: 5,940,436
[45] Date of Patent: Aug. 17, 1999

[54] CIRCUIT FOR ALLOCATING A TRANSMISSION CHANNEL ON THE ELECTRIC NETWORK

[75] Inventor: Joël Huloux, Le Versoud, France

[73] Assignee: SGS-Thomson Microelectronics S.A., Saint Genis, France

[21] Appl. No.: 08/678,487

[22] Filed: Jul. 9, 1996

[30] Foreign Application Priority Data

Jul. 13, 1995 [FR] France .................................. 95 08761

[51] Int. Cl.$^6$ .................. H04B 1/38; H04L 5/16
[52] U.S. Cl. ..................... 375/222; 375/220; 375/272; 370/431; 455/509
[58] Field of Search .................................. 375/219, 220, 375/222, 256, 260, 267, 269, 272, 287, 295, 300, 303, 315, 316, 324, 334, 347, 349; 455/63, 33, 73, 79, 509, 557, 450; 370/329, 341, 431

[56] References Cited

U.S. PATENT DOCUMENTS

| | | |
|---|---|---|
| 4,057,793 | 11/1977 | Johnson et al. . |
| 4,521,891 | 6/1985 | Biba et al. . |
| 4,556,866 | 12/1985 | Gorecki . |
| 4,580,276 | 4/1986 | Andruzzi, Jr. et al. . |
| 4,617,656 | 10/1986 | Kobayashi et al. . |
| 4,656,645 | 4/1987 | Kaneko ...................................... 375/40 |
| 4,797,947 | 1/1989 | Labedz ...................................... 455/33 |
| 4,809,296 | 2/1989 | Braun et al. ................................ 375/1 |
| 4,817,087 | 3/1989 | Yamada . |
| 5,168,510 | 12/1992 | Hill ........................................... 375/40 |
| 5,185,591 | 2/1993 | Shuey .................................... 340/310 A |
| 5,313,492 | 5/1994 | Hashimoto et al. . |
| 5,448,593 | 9/1995 | Hill ........................................ 375/267 |
| 5,603,082 | 2/1997 | Hamabe ................................... 455/63 |
| 5,708,973 | 1/1998 | Ritter . |

OTHER PUBLICATIONS

French Search Report from French Patent Application 95 08761, filed Jul. 13, 1995.
Patent Abstracts of Japan, vol. 011, No. 314 (E–549), Oct. 13, 1987 & JP–A–62 107538 (Hitachi Chem Co. Ltd.).

*Primary Examiner*—Chi H. Pham
*Assistant Examiner*—Emmanuel Bayard
*Attorney, Agent, or Firm*—Wolf, Greenfield & Sacks, P.C.

[57] ABSTRACT

The present invention relates to a circuit for allocating a channel to a transmission between at least two modems that use an electric network as a medium for the transmission of a binary data flow. The circuit includes, on the receive side, a device for selecting a channel that is selected for having the best transmission level according to the energy received on several transmission channels. The transmission of the binary data flow occurs, at least at the beginning of each communication on the several channels.

46 Claims, 2 Drawing Sheets

CIRCUIT FOR ALLOCATING A TRANSMISSION CHANNEL ON THE ELECTRIC NETWORK

BACKGROUND OF THE INVENTION

1. Field of the Invention

This invention relates to the field of digital modulators/demodulators (modems) using an electric network as a transmitting medium. The invention more specifically relates to allocating a channel to a transmission between at least two modems connected to the same electric network.

2. Discussion of the Related Art

Modems using an electric network as a transmitting medium are used in particular in home automation applications. In such applications, different electric devices (heating, lighting, alarm, etc.) connected to the network are associated with modems and thus are likely to be controlled by a central control station according to a timed scenario and/or various types of detectors (temperature, fire, inundation, house-breaking, etc.). The central station is generally associated with a system for receiving instructions transmitted by the telephone network so as to control or program scenarios remotely from the home automation installation.

In such an installation, the electric network at 50 or 60 Hz is the transmitting medium. A frequency shift keying (FSK) modulation is generally used. The data to be transmitted is encoded in a binary form, then converted into an analog signal, for example, as samples of portions of one or the other of two frequencies $f_a$ and $f_b$ which constitute the signal to be transmitted on the network. The amplitude of the modulation is low (around one volt) with respect to the voltage of the power line so as not to harm the supply of the different devices. Installations using an amplitude shift keying modulation can also be found. Here, the binary data is converted into an analog signal, as samples of portions of a frequency which constitutes the signal to be transmitted on the network.

A problem encountered with this type of transmission has to do with the use of the electric network as a transmitting medium. Indeed, the signal received by a given modem is likely to be strongly attenuated due to the transmitting medium used. This attenuation, which is variable and uncontrollable, essentially has two causes.

First, the network impedance at the frequencies used for the modulation varies according to the loads it supplies. This variation of impedance which is substantially inductive and, for example, varies between 1.5 and 80Ω at the frequency of 100 kHz, is uncontrollable since it depends on the loads supplied to the installation involved and on the impedance of the electricity dispensing transformer to which the installation is connected. Moreover, the network impedance depends on the loads supplied in all the installations that the transformer supplies. The attenuation due to these variations of impedance is, for example, between approximately 2 and 40 dB for a typically resistive load.

Second, the electric connections attenuate the signal. This attenuation is even more significant if the signal transmitted by a given modem is addressed to a modem that is connected to another branch of the electric circuit. In other words, the crossing of the prepatch panel and of the fuses and circuit-breakers it includes causes a significant attenuation of the signal (of approximately 20 to 30 dB).

SUMMARY OF THE INVENTION

It is an object of the present invention to overcome these disadvantages by providing a circuit that is able to use several transmission channels and to automatically select the best transmission channel.

It is also an object of the invention to provide an allocation circuit which requires no alteration to the structure of existing modems.

It is a further object of the invention to have the allocation circuits, which have a different number of channels, be compatible with one another without any intervention.

It is a further object of the invention to make the transmission channels user-programmable.

To achieve these objects, an embodiment of the present invention provides a circuit for allocating a channel to a transmission between at least two modems using an electric network as a transmitting medium of a binary data flow, including, on the receive side, a device for selecting a channel chosen for its high quality transmission level according to the energy received on several transmission channels, the transmission taking place, at least at the beginning of each communication, on several channels.

According to another embodiment of the present invention, the circuit includes, on the transmitting side, a device for modulating a signal to be transmitted on at least one frequency selected from among several high frequencies defining the transmission channels.

According to an embodiment of the present invention, said selection device issues a configuration signal to a demodulation device of a signal received on said selected channel.

According to another embodiment of the present invention, the selection device issues all said modulation frequencies to the modulation device while it issues a single one of these frequencies, associated with the channel selected for the communication, to the demodulation device, this single frequency constituting the configuration signal of the demodulation device.

According to an embodiment of the present invention, said modulation device includes at least two multipliers of the data flow by each of said high frequencies issued by said selection device and a mixer of the output signals of said multipliers.

According to another embodiment of the present invention, said demodulation device includes a multiplier receiving, as inputs, a signal coming out from the network after being filtered and the high frequency associated with the channel selected and issued by said selection device.

According to an embodiment of the present invention, said modulation device is associated with a switch receiving, as inputs, the different modulation frequencies, said switch being controlled according to the channel selected by said selection device.

According to an embodiment of the present invention, said selection device further issues a signal indicating the channel selected to a processor for controlling the modem, said processor sending to the allocation circuit a control signal that enables forcing of the modulation and demodulation frequencies.

According to an embodiment of the present invention, the selection of the transmission channel is performed, on the receive side, during a frame for establishing a communication sent, on all channels, by a transmitter modem.

According to an embodiment of the present invention, said signal to be transmitted is a binary data flow converted into a modulated signal in the form of samples of portions of two frequencies centered on an initial central frequency by a frequency shift keying modulator, the modulation being performed by said modulation device consisting of shifting said initial central frequency towards at least one higher frequency while respecting the distance between the two frequencies of the FSK modulation.

According to an embodiment of the present invention, the output of said multiplier of the demodulation device is sent to a band-pass filter having a bandwidth that corresponds to said distance between the frequencies of the FSK modulation and which is centered on said initial frequency, the output of said bandpass filter being sent to an FSK demodulator for restoring a binary data flow.

According to another embodiment of the present invention, said signal to be transmitted is a binary data flow converted into a modulated signal in the form of samples of portions of a frequency by an amplitude shift keying modulator, the modulation being performed by said modulation device consisting of shifting said frequency of said ASK modulator towards at least one higher frequency.

BRIEF DESCRIPTION OF THE DRAWINGS

The objects, features and advantages of preferred, nonlimiting embodiments of the present invention will be described by way of example with reference to the accompanying drawings, in which.

For clarity, only those elements useful to the understanding of the invention have been shown in the drawings. Moreover, the same elements are referred to by the same references in the different drawings.

DETAILED DESCRIPTION

A feature of the present invention is to perform a modulation of a signal to be transmitted on several frequencies $f'_i$, each of which defines a transmission channel. It is thus possible to select, according to the network impedance between two modems desiring to communicate, the transmission frequency which is least attenuated.

If the transmission is to be performed in FSK modulation, the circuit according to the invention performs an overmodulation, on at least one frequency $f'_i$, of a data flow Tx already modulated by frequency shift keying (FSK). This overmodulation shifts the central frequency $f_c$ of the two frequencies $f_a$ and $f_b$ of the FSK modulation towards at least one higher frequency $f_i$ while respecting the distance $\Delta f = f_b - f_a$ of the FSK modulation.

In the case of an ASK modulation, a binary data flow can be directly modulated on at least one frequency $f'_i$ by the allocation circuit according to an embodiment of the invention. If the allocation circuit is associated with an existing modem, it performs an overmodulation, on at least one frequency $f'_i$, of a signal already modulated by amplitude shift keying. This overmodulation shifts the carrier $f_c$ of the ASK modulation towards at least one higher frequency $f_i$.

Figure 1:
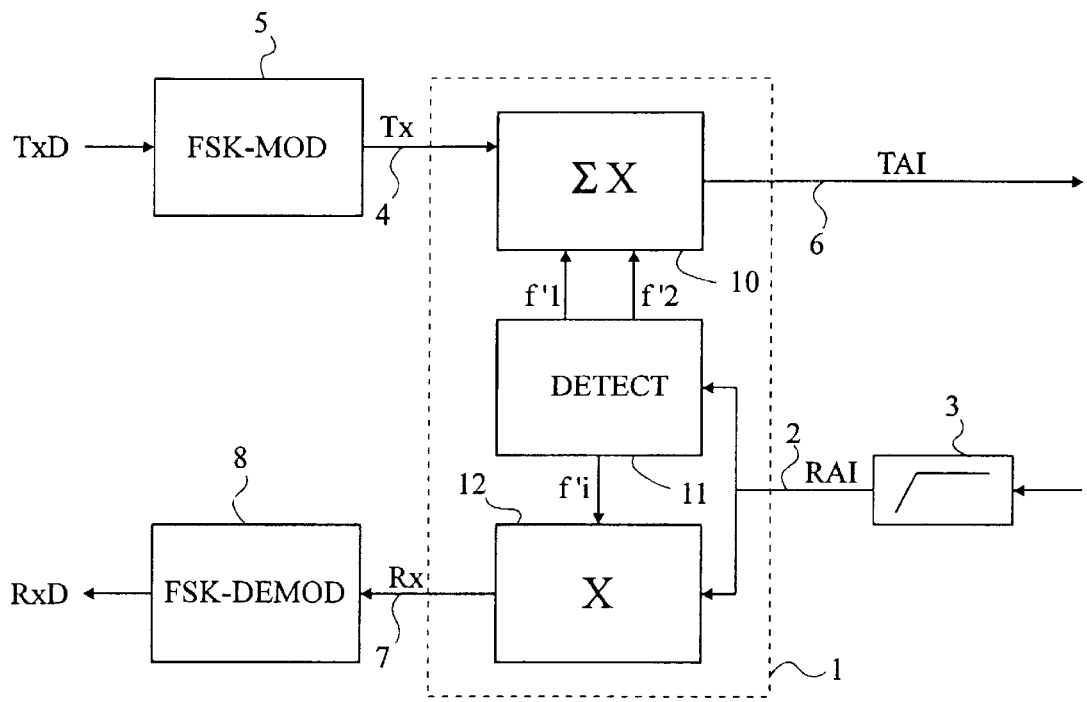
FIG. 1 shows a circuit for allocating a transmission channel to a transmission of data modulated by frequency shift keying according to a first embodiment of the invention.

FIG. 1 shows a first embodiment of a circuit for allocating a transmission channel to a transmission of data modulated by frequency shift keying.

Allocation circuit 1 is interposed between an electric network, constituting a medium of transmission by carrier current, and the modulator/demodulator itself.

A first input terminal 2 of circuit 1 receives a signal RAI extracted from the network by means of an interface 3 that suppresses the high-voltage and low-frequency component which corresponds to the carrier supplied by the electric supply.

A second input terminal 4 of circuit 1 receives a signal to be transmitted Tx. In the example shown, this signal Tx is a signal modulated by frequency shift keying by a modulator FSK_MOD 5. The modulation performed by circuit 1 is applied to this signal Tx, for issuing, on a first output terminal 6 of circuit 1, a signal TAI to the electric network.

A second output terminal 7 of circuit 1 issues a flow of received data Rx from the signal RAI received. If signal RAI is an FSK modulated signal, signal Rx is modulated by frequency shift keying again and is sent to a demodulator FSK_DEMOD 8.

Circuit 1 includes a modulation device 10, on at least one high frequency $f'_i$ defining a transmission channel, of the signal Tx to be transmitted. If, as is shown, the input 4 of circuit 1 is connected to the output of an FSK modulator 5, signal Tx already is an FSK modulated signal. The device 10 then shifts the central frequency $f_c$ of the FSK modulation towards at least one high frequency $f_i$ while respecting the distance $\Delta f$ between the two frequencies $f_a$ and $f_b$ of the FSK modulation.

Circuit 1 also includes a device 11 for selecting a transmission channel among several modulation frequencies $f'_i$ that it generates. Circuit 1 further includes a demodulation device 12 for restoring a signal Rx of the same type as signal Tx. If signal Rx is an FSK modulated signal, device 12 shifts the high frequency $f_i$ of signal RAI towards the central frequency $f_c$ of the FSK modulation. If signal Rx is an ASK modulated signal, device 12 shifts the high frequency $f_i$ of signal RAI towards the carrier of the original ASK modulation. If, conversely, signal Rx is a binary data flow, device 12 directly restores this binary data flow.

Circuit 1 issues a single high frequency $f'_i$ corresponding to the transmission channel selected at the demodulation device 12. Conversely, it issues to overmodulation device 10 all the frequencies $f'_i$ it generates, here two frequencies $f'_1$ and $f'_2$, to enable a transmission on all transmission channels.

A feature of the present invention is that the allocation of a transmission channel between two modems, respectively transmitter and receiver of a transmission, is performed, by the receiver modem, according to the attenuation undergone by different channels carrying the same data flow Rx on the signal TAI transmitted by the transmitter modem.

According to the first embodiment shown in FIG. 1, the signal TAI transmitted by a modem is constituted by several identical FSK modulated data flows having different central frequencies $f_1$ and $f_2$.

When a transmitter modem wants to transmit a binary data flow TxD, this flow is modulated by frequency shift keying by its FSK modulator 5. Signal Tx is overmodulated, within device 10, by being multiplied by the different high frequencies $f'_1$ and $f'_2$ issued by device 11. The results of these multiplications are added, or mixed, as will be seen further on in conjunction with FIG. 5, to constitute signal TAI. Signal TAI thus includes two identical binary data flows with different central frequencies $f_1$ and $f_2$. Attention will be paid to keeping the distances between the high frequencies $f'_1$ and $f'_2$ generated by circuit 11 higher than the distance $\Delta f$ between the two frequencies $f_a$ and $f_b$ of the FSK modulation.

The signal RAI received by a receiver modem thus includes all these identical data flows. But, depending on the frequencies $f_i$ at which the different flows are transmitted, they will be more or less attenuated according to the network impedance between the two modems.

The device 11 of the receiver modem selects, among the frequencies $f_i$, the one it best receives. In other words, the device 11 of a receiver modem selects, among all the transmission channels of the installation, the one for which the data flow contained in the signal RAI it receives is least attenuated. As soon as it has selected a transmission (reception) channel, it supplies demodulation device 12 with the frequency $f'_i$ which corresponds to this channel. Thus, demodulator 12 is configured on the channel it best receives from the transmitter modem. It then restores the data flow Rx of this channel as will be seen hereafter in conjunction with FIG. 6 and transmits it to FSK demodulator 8.

An advantage of the present invention is that it enables allocation of the best possible channel to the communication.

Another advantage of the invention is that this allocation is performed automatically.

According to the first embodiment, the allocation of the transmission channel can change during the communication. Indeed, device 11 continuously examines the level of the different channels and configures device 12 accordingly.

Such an embodiment is particularly convenient for applications where the transmissions are long, that is, in cases where the network impedance is likely to change frequently during a same transmission.

An advantage of the present invention is that it allows use of different transmission channels for the same communication addressed to several modems while respecting the selection of the best transmission channel by each of the receiver modems. Indeed, as the transmitter modem transmits the whole message on all channels, each receiver modem can allocate the channel on which the transmission is best received.

Figure 2:
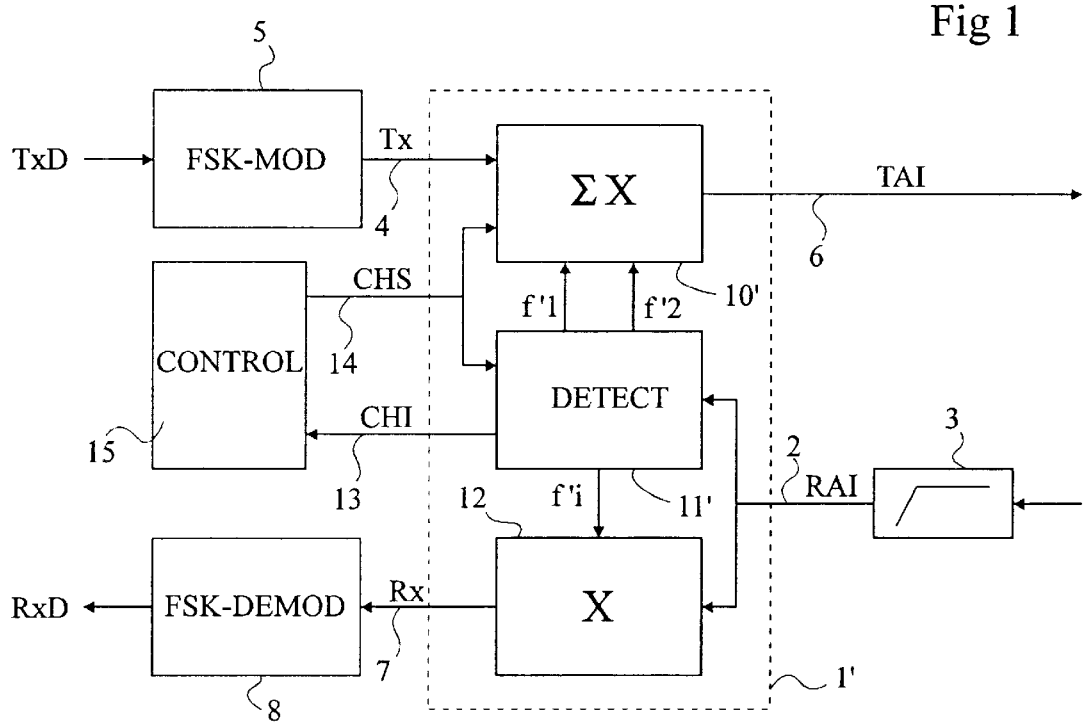
FIG. 2 shows a circuit for allocating a transmission channel to a transmission of data modulated by frequency shift keying according to a second embodiment of the invention.

FIG. 2 shows a second embodiment of a circuit 1' for allocating a transmission channel to a transmission of data modulated by frequency shift keying.

According to this second embodiment, a single transmission channel is allocated to a given communication. This channel is always automatically selected according to the attenuation undergone by the different channels, but it is not modified during the communication.

The difference between the first and second embodiments is essentially the fact that selection device 11' issues, on a third output terminal 13 and for a digital circuit or processor 15 for controlling the modem, a signal CHI indicating the channel selected. Further, circuit 1' receives, on a third input terminal 14, a signal CHS issued by control processor 15 and for forcing the allocation of a modulation channel. In other words, according to the state of signal CHS, device 10' uses either all the frequencies $f'_i$ generated by device 11' to establish the communication or a single one of these frequencies $f'_i$ when the communication is established. For this purpose, device 10' includes, as will be seen in conjunction with FIG. 5, means, for example logic, for switching the inputs of its mixer. Signal CHS is also sent to device 11' to force the high frequency $f'_i$ that it issues to device 12.

When wanting to send a message, a transmitter modem starts, according to the second embodiment, by transmitting a frame for establishing the communication on the network. The role of this frame is to enable the addressed modem to allocate a channel to the communication.

When no communication is present on the network, all the modems in the installation are set in a scanning mode in which they monitor the appearance of a transmission.

Figure 3:
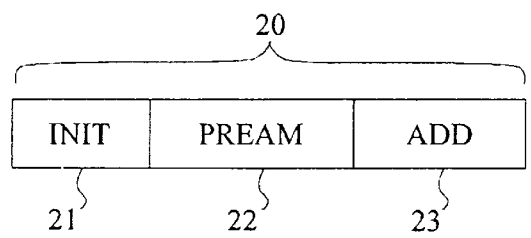
FIG. 3 shows the shape of a frame for establishing a communication according to the second embodiment of the invention shown in FIG. 2.

FIG. 3 shows an example of a frame 20 for establishing a communication according to the second embodiment shown in FIG. 2.

This frame 20 is transmitted by a transmitter modem and is overmodulated on all the high frequencies $f'_i$ (here, $f'_1$ and $f'_2$) which are issued, by its device 11', to its device 10'. Thus, the signal TAI transmitted during a frame 20 for establishing a communication is constituted by several identical FSK modulated data flows having different central frequencies $f_i$.

Frame 20 begins with a first pseudo-random sequence INIT 21. This sequence 21 enables the devices 11' of the other modems connected to the network to select, in their signal RAI (corresponding to the signal TAI transmitted by the transmitter modem), the frequency $f_i$ it best receives. In other words, and similar to the first embodiment, these devices 11' select, from among all the transmission channels of the installation, the one for which the signal contained in signal RAI is the least attenuated. As soon as they have selected a transmission channel, the devices 11' supply the demodulation devices 12 with which they are respectively associated with the frequency $f'_i$ corresponding to this channel. The duration of sequence INIT 21 is set according to the time required for this selection by the devices 11' of the installation modems. Thus, at the end of sequence INIT 21, all the devices 12 of the installation modems are configured on the channel that they best receive from the transmitter modem.

Sequence INIT 21 is followed by a second sequence PREAM 22 containing a predetermined code for identifying a frame for establishing a communication. This sequence 22 is used by the modems which receive it for determining that they are receiving a frame 20.

Sequence PREAM 22 is followed by a third sequence ADD 23 containing the addresses of the transmitter modem and of the receiver modem to which the message that the transmitter modem is about to send is addressed. The transmitter modem is switched to a reception or scanning mode as soon as it has finished transmitting frame 20.

Sequences PREAM 22 and ADD 23 are interpreted by processor 15 for controlling the modem which has the function, among others, of exploiting the information contained in data flow RxD.

If a modem of the installation recognizes its address in sequence ADD 23, its processor 15 switches it to a transmission mode so that it indicates to the transmitter modem the transmission channel it wishes to allocate to the communication.

This indicating is performed by the receiver modem by itself transmitting a frame 20 for establishing a communication. However, this frame is overmodulated only on the high frequency $f'_i$ which has been selected by its device 11'. For this purpose, processor 15 uses the indication of the selected channel which it gets from the signal CHI issued by the device 11' with which it is associated. It then indicates to device 10', by means of signal CHS, this selected channel.

In the sequence ADD 23 of its frame 20, the receiver modem indicates its own address as well as the address of the transmitter modem to which the frame 20 is sent.

Thus, the transmitter modem only receives a frame 20 on its central frequency $f_i$ (here, $f_1$ or $f_2$). Its device 11' will thus select the channel associated with this frequency since the level of the other channels is zero. Its device 12 is thus configured on the channel used for the answer of the receiver modem. As for the receiver modem, the processor 15 of the transmitter modem forces its circuit 1', by means of signal CHS, to now transmit only on the selected channel.

This channel is now allocated to the communication between the two modems. The transmitter modem can then send its message in a conventional way.

When a transmitter modem wants to transmit the same message to several receiver modems, it is preferably provided that the receiver modems are dispensed from transmitting an answer frame 20 to avoid that two modems transmit, at the same time, an answer frame 20 to the same transmitter modem. The frame 20 sent by the transmitter modem then includes a code enabling the receiver modems to identify that the transmitter modem intends to establish a transmission to a group of modems. The transmitter modem sends its message on all channels.

It should thus be noted that the second embodiment can reproduce the operation of the first embodiment. In order to do this, signal CHS just has to be maintained in the state which corresponds to the establishing of a communication. The device 10' of the transmitter modem then permanently uses all frequencies $f'_i$.

It can also be provided that all the receiver modems send an answer frame 20 to the transmitter modem. For this purpose, it is provided, for example, that when a modem receives a frame 20 addressed to it and which includes a group transmission code, it will delay its switching to the transmitting mode by a specific predetermined time. It thus remains in the scanning mode during this time and thus cannot send its answer frame 20 if another modem is sending one. The role of the delay allocated, in this case, to each modem, is to avoid for two receiver modems to switch at the same time to the transmitting mode. The transmitter modem will thus receive as many frames 20 as there are modems receiving the transmission. Each frame 20 indicates to this transmitter modem a transmission channel, which enables it to configure its overmodulation device on the channels chosen by the receiver modems. Of course, several receiver modems can have selected a same channel.

According to an alternative embodiment, the channel allocation is performed without the intervention of the processor 15 of the modem. Device 11', once it has selected the best channel it receives, can indeed be able to issue, by itself, a single frequency $f'_i$ to device 10', as for device 12.

However, it will be preferred to be able to force, by means of processor 15, the transmission channel. This has the advantage, according to the invention, to enable a personalized configuration of the different circuits 1'.

For example, this allows several different communications transmitted on the same network to which several groups of modems are connected. Indeed, the signals CHS can be used to configure the modems of the installation by groups of modems using different channels. To keep the ability to allocate a transmission channel according to the reception level, more channels than groups of modems have to be available. The modems of the same group would all be configured, by means of signal CHS, so that their device 11' only supplies device 12 with the frequencies $f'_i$ which correspond to the channels selected for this group, and so that device 10' uses these frequencies $f'_i$ only.

Such a group distribution is particularly interesting when the modems of the installation can be distributed into groups where modems of the same group do not need to communicate with modems from another group.

It should be noted that signals CHI and CHS are preferably signals over several bits if the circuits 1' have more than two channels. The number of bits is, for example, equal to the number of channels.

Figure 4:
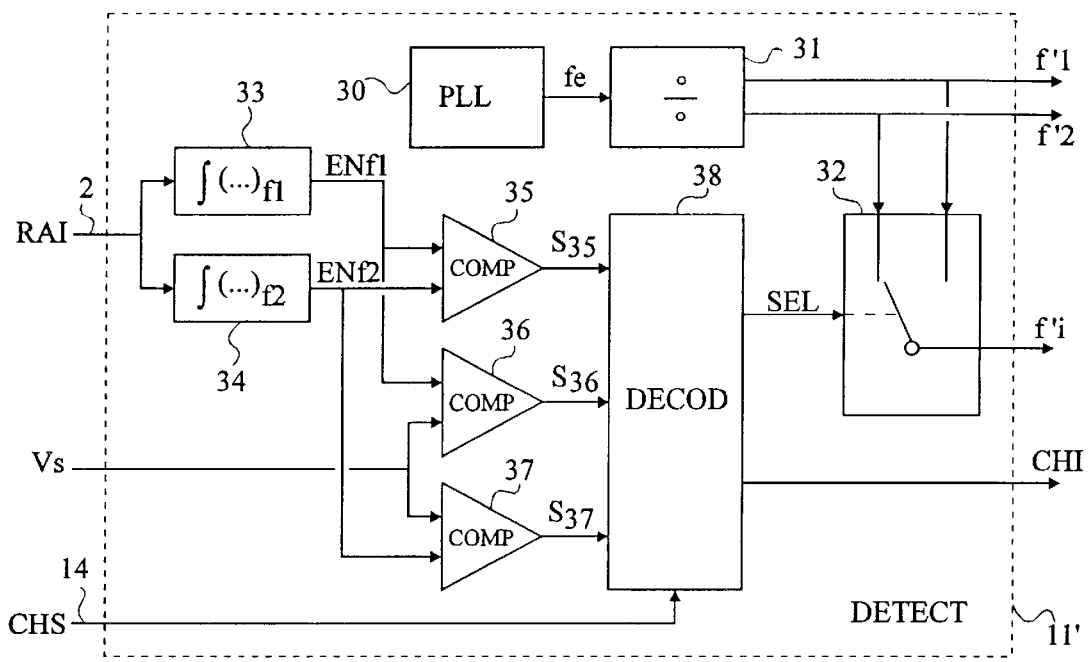
FIG. 4 shows an embodiment of a device for selecting the transmission channel according to the second embodiment of the invention shown in FIG. 2.

FIG. 4 shows an embodiment of a selection device 11' of an allocation circuit 1' as shown in FIG. 2.

As it has been observed above, this device 11' generates the high frequencies $f'_i$ (in the example shown, $f'_1$ and $f'_2$) for device 10' and selects the best channel to supply device 12 with the corresponding high frequency $f'_1$ or $f'_2$.

Device 11' includes a phase-locked loop 30 which issues an input frequency $f_e$ to a frequency divider 31. Frequency divider 31 is, preferably, a digital divider and is dimensioned to issue as many frequencies $f'_i$ as there are channels provided for circuit 1'. The frequency $f_e$ issued by PLL 30 is selected to be a multiple of each of the frequencies $f'_i$ that are desired to be obtained. The frequencies $f'_1$ and $f'_2$ are issued to device 10' and to a switch 32 for selecting, according to an order value SEL it receives, that of frequencies $f'_1$ or $f'_2$ which is issued to device 12.

The signal RAI received by circuit 1' is sent to a number of integrators (here, two) 33 and 34 equal to the number of channels of circuit 1'. These integrators 33 and 34 issue the energy levels $EN_{f1}$ and $EN_{f2}$ of the respective data flows present on each of the channels. These energy levels $EN_{f1}$ and $EN_{f2}$ are sent to two inputs of a first comparator COMP 35. The output signal $S_{35}$ of this comparator 35 allows identification of the channel which is received with the highest energy level.

Preferably, energy levels $EN_{f1}$ and $EN_{f2}$ are also sent to secondary comparators COMP, respectively 36 and 37, which have the function of comparing each level $EN_{f1}$ and $EN_{f2}$ to a threshold value Vs. This prevents a communication from being established if all the channels are received with too low an energy level.

It should be noted that the higher the number of frequencies $f'_i$ generated by the device 11', the less risk that communication cannot be established.

The outputs $S_{35}$, $S_{36}$ and $S_{37}$ of comparators 35, 36 and 37 are sent to a logic circuit DECOD 38 also receiving signal CHS. The role of circuit 38 is to issue, according to the respective states of the different signals $S_{35}$, $S_{36}$, $S_{37}$ and CHS, signal SEL for controlling switch 32. The practical implementation of logic circuit 38 is within the abilities of those skilled in the art according to the functional indications given in the present description.

If the two signals $S_{36}$ and $S_{37}$ are in a state indicating that no channel is received with a sufficient level, the frame 20 received cannot be demodulated since no frequency $f'_i$ is issued to the device 12 of the receiver modem. Thus, this modem transmits no answer frame 20. As the transmitter modem waits for this frame 20 to start sending its message, it knows, after a predetermined time, that no channel can adequately transmit the message to the receiver modem.

An advantage of the present invention is that it gives a quick indication (in about the time of two frames 20) to the transmitter modem whether it will be able to send a message to a given modem that can receive it correctly. Thus, a modem which has to transmit several different messages to several different modems (for example, the central station of a home automation installation) need not waste time transmitting a message which will not be received correctly and which it thus should, in conventional circuits, transmit again. It can thus attempt to transmit another message to another modem and retry transmission to the first modem later.

The constitution of the above-discussed selection device 11' transposes to that of a device 11 according to the first embodiment of the allocation circuit 1 discussed in conjunction with FIG. 1. It is only necessary to suppress signals CHS and CHI and to modify circuit 38 so that it does not take these signals into account.

Integrators 33 and 34 are implemented in a conventional fashion. The only imperative is that the input filter included in each integrator 33 and 34 be a band-pass filter with a band width substantially corresponding to the distance $\Delta f$ between the two frequencies $f_a$ and $f_b$ of the FSK modulation, and being centered on the frequency $f_1$ or $f_2$ to which the integrator is associated.

It should be noted that the above-discussed device 11' can be strictly unchanged if signal Tx is an ASK modulated signal. For this purpose, the carrier frequency of signal Rx has to be included between the frequencies $f_a$ and $f_b$ of the FSK modulation for which the device 11' is provided. Indeed, the frequencies $f_1$ and $f_2$ of the transmission channels will then be included in the pass-bands of integrators 33 and 34.

If signal Tx readily is the binary data flow, the integrators are sized to calculate the energy levels received in the vicinity of the frequencies, respectively $f'_1$ and $f'_2$.

Figure 5:
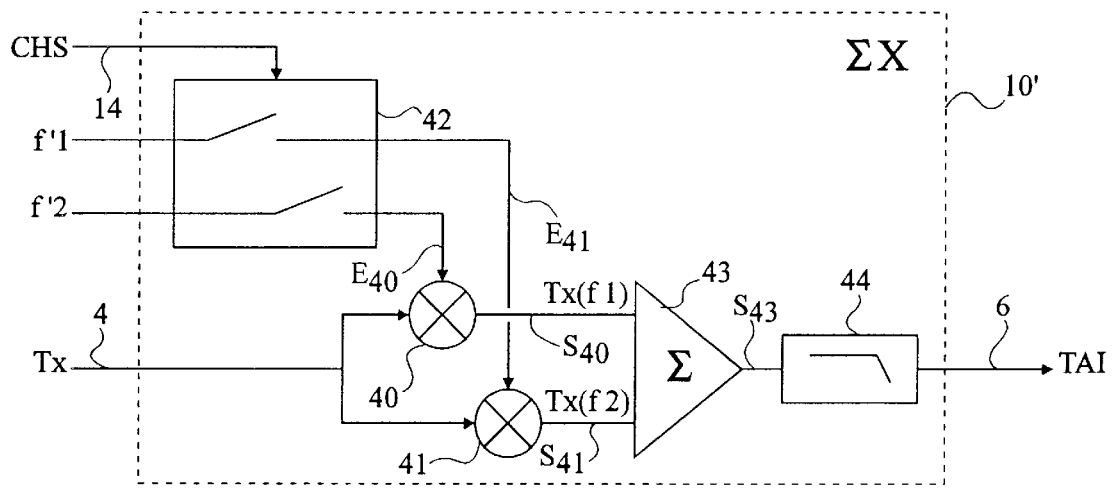
FIG. 5 shows an embodiment of a modulation device of an allocation circuit according to the second embodiment of the invention shown in FIG. 2.

FIG. 5 shows an embodiment of a modulation device 10' of an allocation circuit 1' as shown in FIG. 2.

Device 10' includes two multipliers 40 and 41 receiving, on a first input, signal Tx. A second input $E_{40}$ and $E_{41}$ of each multiplier receives one of the frequencies $f'_1$ or $f'_2$ generated by device 11'. These frequencies $f'_1$ and $f'_2$ are issued to inputs $E_{40}$ and $E_{41}$, via a switching circuit 42. Circuit 42 is controlled by signal CHS.

The outputs $S_{40}$ and $S_{41}$ of multipliers 40 and 41 issue the FSK modulated data flow Tx centered, respectively, on frequencies $f_1$ or $f_2$. The new central frequencies $f_1$ and $f_2$ of the FSK modulated data flows correspond to the central frequency $f_c$ of FSK modulator 5 multiplied by the frequencies, respectively $f'_1$ and $f'_2$. Outputs $S_{40}$ and $S_{41}$ are sent to inputs of a mixer 43. The output $S_{43}$ of mixer 43 thus issues, when the two frequencies $f'_1$ and $f'_2$ are sent to inputs $E_{40}$ and $E_{41}$, a signal including twice the data flow Tx centered on different frequencies $f_1$ and $f_2$. When a single frequency $f'_1$ or $f'_2$ is selected by means of signal CHS, for example, when the communication is established, output $S_{43}$ delivers the data flow Tx centered on frequency $f_1$ or $f_2$, respectively.

The signal issued by mixer 43 flows across a low-pass filter 44 for eliminating the possible high-frequency noise. The frequency of filter 44 is chosen to be higher than the maximum frequency of frequencies $f_1$ and $f_2$ plus the distance $\Delta F$ of the FSK modulation. The output of filter 44 constitutes signal TAI.

The constitution of the above-discussed overmodulation device 10' transposes to that of a device 10 according to the first embodiment of allocation circuit 1 discussed in conjunction with FIG. 1. It is only necessary to suppress switching circuit 42 and send the frequencies $f'_1$ and $f'_2$ issued by device 11 directly on the inputs $E_{40}$ and $E_{41}$ of multipliers 40 and 41.

If signal Tx is an ASK modulated signal or a binary data flow, the constitution of device 10' or 10 is identical.

Figure 6:
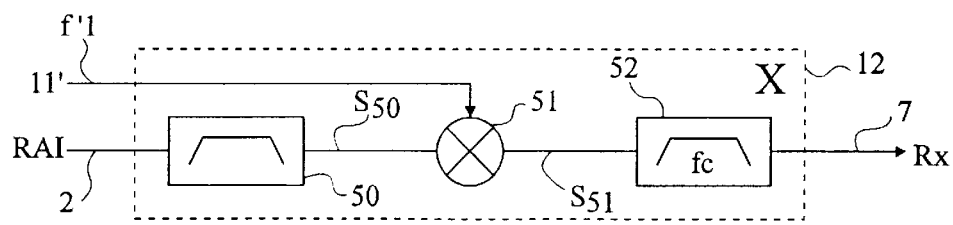
FIG. 6 shows an embodiment of a demodulation device of an allocation circuit according to the embodiments shown in FIGS. 1 and 2.

FIG. 6 shows an embodiment of a demodulation device 12 for restoring a flow of received data Rx centered on the central frequency $f_c$ of FSK demodulator 8 (FIGS. 1 or 2) of circuit 1 or 1'.

Signal RAI preferably crosses a first band-pass filter 50 centered on the frequency $f_i$ corresponding to the channel selected by device 11 and having a pass-band corresponding to the distance in frequency $\Delta f$ of the FSK modulation. The control of filter 50 by device 11 has not been shown on the drawings.

The output $S_{50}$ of filter 50 is sent to a first input of a multiplier 51 having a second input which receives the frequency $f'_i$ issued by device 11 or 11'. Multiplier 51 thus behaves as a demodulator of the signal transmitted with a central frequency $f_i$. Thus, at the output of multiplier 51, the frequency spectrum includes frequencies $f_a$ and $f_b$, or $f_c - \Delta f$ and $f_c + \Delta f$, of the FSK modulation.

As an alternative, filter 50 has a pass-band which includes all the frequencies likely to be transmitted by the different channels. In other words, its pass-band is then comprised between the smallest of frequencies $f_i$, minus half the distance in frequency $\Delta f$ of the FSK modulation, and the greatest of frequencies $f_i$, plus half the distance $\Delta f$. The frequency spectrum at the output of the multiplier includes, in this case, the frequencies $f_i - \Delta f$ and $f_i + \Delta f$ of all the channels present in signal RAI except the frequencies associated with the channel demodulated by frequency $f'_i$. The frequencies of this channel have become the frequencies $f_a$ and $f_b$, or $f_c - \Delta f$ and $f_c + \Delta f$, of the FSK modulation again.

The signal $S_{51}$ issued by multiplier 51 crosses a bandpass filter 52 having a pass-band corresponding to frequencies $f_a$ and $f_b$ of the FSK modulation. Filter 52 thus eliminates all the data flows still centered on frequencies $f_i$. The output of filter 52 constitutes the signal Rx sent to FSK demodulator 8.

As for device 11 or 11', the above-discussed device 12 operates, without modification, if signal Tx is in ASK modulation, provided that its carrier frequency is comprised between the frequencies $f_a$ and $f_b$ for which the circuit 1 or 1' has been sized.

As an alternative, filter 52 may be a low-pass filter having a cut-off frequency corresponding to the maximum frequency $f_b$ of the FSK modulation or the frequency of the FSK modulation.

The actual frequencies $f_a$ and $f_b$ of the FSK modulation are, preferably, comprised between 200 Hz and 10 kHz. Such a selection allows optimization of the operation of the FSK demodulator. Further, it makes the implementation of a band-pass filter of a high order in device 12 easier, since the central frequency $f_c$ is then relatively low.

Frequencies $f_1$ and $f_2$ are chosen to be high (for example between 80 and 150 kHz) with respect to the power supply frequency (50 or 60 Hz).

As a specific example of implementation, an allocation circuit 1 or 1' according to the invention can be implemented with frequency values indicated hereafter.

Frequencies $f_a$ and $f_b$ of the FSK modulator and demodulator are, for example, respectively 4.8 kHz and 6 kHz. The distance in frequency Δf is thus 1.2 kHz and the central frequency $f_c$ is 5.4 kHz.

The cut-off frequencies of band-pass filter 52 of demodulation device 12 are, in this case, 4.8 kHz and 6 kHz, the filter being symmetrical.

For example, three frequencies $f'_1$, $f'_2$ and $f'_3$ generated by selection device 11 or 11' are selected. These frequencies are for example respectively 99 kHz, 110 kHz and 132 kHz. Frequency $f_e$ of PLL 30 is, for example, 3.960 MHz and thus corresponds to a multiple of 40, 36 and 30 of frequencies $f'_1$, $f'_2$ and $f'_3$, respectively.

The central frequencies obtained for the different channels correspond to the sum of the frequency $f'_1$, $f'_2$ or $f'_3$ corresponding to the channel and of the central frequency $f_c$ of the actual FSK modulation. Three channels having, respectively, central frequencies $f_1$, $f_2$ or $f_3$ of 104.4 kHz, 115.4 kHz and 137.4 kHz are thus obtained.

These channels effectively meet the condition that the modulated signals that they transmit must not overlap. Indeed, the data are transmitted as samples of portions of frequencies of 103.8 and 105 kHz for the first channel, of 114.8 and 116 kHz for the second channel and of 136.8 and 138 kHz for the third channel.

The band-pass filters of the integrators of selection device 11 or 11' have a bandwidth of 1.2 kHz and are centered, respectively on the frequencies of 104.4 kHz, 115.4 kHz and 137.4 kHz. The cut-off frequency of low-pass filter 44 of modulation device 10 or 10' is, for example, 140 kHz.

According to a third embodiment not shown, modulation device 10 (FIG. 1) or 10' (FIG. 2) and FSK modulator 5 can be replaced by digital FSK modulators of a same data flow TxD, directly on at least two different central frequencies $f_i$. In this case, selection device 11 or 11' does not have to generate high frequencies $f'_i$. The digital outputs of the FSK modulators are each converted into an analog signal. These analog signals cross a switch controlled by signals then delivered by the selection circuit instead of the frequencies $f'_i$.

An advantage of the present invention is that it optimizes the operation of modems using the electric network as a transmitting medium by authorizing the use of different central frequencies $f_i$ of the FSK modulated data flow.

Another advantage of the present invention is that it requires no modification to the structure of the FSK modulators and demodulators. The circuit according to the invention can thus be used in an existing installation, in particular when implemented according to the first embodiment shown in FIG. 1 where it requires no connection with the modem processors. An allocation circuit 1 is installed between each modem and the electric network.

Another advantage of the present invention is that allocation circuits, whether they are implemented according to the first or the second embodiment, and whether or not they different numbers of channels, are perfectly compatible with one another. Indeed, if two allocation circuits have at least one common frequency $f_i$, this is enough for them to allow communication between the two modems with which they are respectively associated.

Another advantage of the present invention is that it allows using the same network and the same modem to transmit messages on different channels.

It can also be provided that the allocation circuit 1 or 1' according to the invention be made programmable by the user. Indeed, if divider 31 and the filters of integrators 33 and 34 of device 11 or 11' are made programmable, this is enough for the user to be able to chose the channel frequency. If the other filters of circuit 1 are not programmable as well, the usable frequency range is however limited by the cut-off frequency of low-pass filter 44 of device 10 or 10'.

Of course, the present invention is likely to have many alterations and modifications which will appear to those skilled in the art. In particular, each of the components described can be replaced by one or several elements performing the same function.

Moreover, the present invention applies whether the modulation used is an FSK or an ASK modulation and whatever the type of binary data and the structure of the message to transmit may be.

While some of the former explanations have been disclosed, for clarity, in terms sometimes corresponding to an analog operation, it should be clear to those skilled in the art that all the elements of the allocation circuit according to the present invention which can process digital signals can correspond, in practice, to software implementations.

Having thus described at least one illustrative embodiment of the invention, various alterations, modifications, and improvements will readily occur to those skilled in the art. Such alterations, modifications, and improvements are intended to be within the spirit and the scope of the invention. Accordingly, the foregoing description is by way of example only and is not intended to be limiting. The invention is limited only as defined in the following claims and the equivalent thereto.

What is claimed is:

1. A circuit for allocating a transmission channel between at least two modems using an electric network as a medium for transmission of a binary data flow, the circuit comprising:

a receiving portion coupled to the electric network;
   a transmitting portion coupled to the electric network; and
   a selection device, in the receiving portion and coupled to the transmitting portion, that selects the transmission channel to allocate based upon the transmission channel having a highest transmission level according to an energy received on a plurality of transmission channels at least at a beginning of a communication wherein the binary data flow transmission occurs simultaneously on each transmission channel of the plurality of transmission channels at least at the beginning of the communication and;
   a modulation device, in the transmitting portion and coupled to the electric network and the selection device, that modulates a first signal to be transmitted on at least one frequency that is selected from among a plurality high frequencies that define the plurality of transmission channels;
   wherein the selection device issues a configuration signal to configure a demodulation device to receive a second signal on the transmission channel, the demodulation device being coupled to the selection device and the electric network in the receiving portion of the circuit, and wherein the selection device issues the plurality of high frequencies to the modulation device and issues a single frequency of the plurality of high frequencies to said demodulation device, the single frequency being associated with the transmission channel for the communication and constituting the configuration signal of the demodulation device.

2. The circuit of claim 1, wherein the modulation device includes:

a plurality of multipliers that receive the first signal and multiply the first signal by a respective one of the plurality of high frequencies issued by the selection device and produce a corresponding plurality of multiplier output signals; and a mixer, coupled to the plurality of multipliers that receives and mixes the corresponding plurality of multiplier output signals.

3. The circuit of claim 1, wherein the demodulation device includes a multiplier that receives the second signal coming from the electric network after being filtered and the single frequency associated with the transmission channel which is issued by said selection device.

4. The circuit of claim 1, wherein the modulation device is associated with a switch that receives, as inputs, the plurality of high frequencies, the switch being controlled according to the transmission channel selected by said selection device.

5. The circuit of claim 1, wherein the selection device further issues an indication signal indicating the transmission channel selected to a processor for controlling a first of the at least two modems, the processor sending to the circuit a control signal for forcing the modulation and demodulation frequencies.

6. The circuit of claim 1, wherein selection of the transmission channel is performed during a frame for establishing the communication, sent by a transmitter modem of the at least two modems, simultaneously on each transmission channel of the plurality of transmission channels.

7. A circuit for allocating a transmission channel between at least two modems using an electric network as a medium for transmission of a binary data flow, the circuit comprising:

a receiving portion coupled to the electric network;

a transmitting portion coupled to the electric network; and a selection device, in the receiving portion and coupled to the transmitting portion, that selects the transmission channel to allocate based upon the transmission channel having a highest transmission level according to an energy received on a plurality of transmission channels at least at a beginning of a communication, wherein the binary data flow transmission occurs simultaneously on each transmission channel of the plurality of transmission channels at least at the beginning of the communication and;

a modulation device, in the transmitting portion and coupled to the electric network and the selection device, that modulates a first signal to be transmitted on at least one frequency that is selected from among a plurality high frequencies that define the plurality of transmission channels;

wherein the first signal to be transmitted is the binary data flow converted into a first modulated signal in a form of samples of portions of two frequencies centered on an initial central frequency by a frequency shift keying modulator, further modulation being performed by the modulation device and consisting of shifting the initial central frequency towards at least one of the plurality of high frequencies while respecting a distance between the two frequencies of the frequency shift keying modulation.

8. The circuit of claim 3, wherein:

the first signal to be transmitted is the binary data flow converted into a first modulated signal in a form of samples of portions of two frequencies centered on an initial central frequency by a frequency shift keying modulator, further modulation being performed by the modulation device and consisting of shifting the initial central frequency towards at least one of the plurality of high frequencies while respecting a distance between the two frequencies of the frequency shift keying modulation; and an output of the multiplier of the demodulation device is sent to a band-pass filter having a bandwidth corresponding to the distance between the two frequencies of the frequency shift keying modulation and which is centered on the initial frequency, an output of said band-pass filter being sent to a frequency shift keying demodulator for restoring the binary data flow.

9. The circuit of claim 1, wherein the first signal to be transmitted is the binary data flow converted into a first modulated signal in a form of samples of portions of a frequency by an amplitude shift keying modulator, further modulation being performed by the modulation device and consisting of shifting the frequency of the amplitude shift keying modulator towards at least one of the plurality of high frequencies.

10. A circuit for allocating a transmission channel to a communication between a first modem and a second modem that communicate over an electric network, the transmission channel being allocated from one of a plurality of transmission channels and the communication beginning on at least two transmission channels of the plurality of transmission channels the circuit comprising:

a first input terminal to receive a first signal from the second modem over the electric network;

a selection device, coupled to the first input terminal to receive the first signal and select the transmission channel to allocate based upon the transmission channel having a highest quality of transmission according to a level of energy received on the plurality of transmission channels;

a second input terminal to receive a second signal from the first modem;

a first output terminal to transmit a modulated signal over the electric network; and a modulation device, coupled to the second input terminal, the first output terminal, and the selection device, to modulate the second signal on at least one frequency of a plurality of frequencies and produce the modulated signal, each frequency of the plurality of frequencies defining a respective transmission channel of the plurality of transmission channels.

11. The circuit of claim 10, wherein the second signal is a binary data flow converted into a modulated signal in a form of samples of portions of two frequencies centered on an initial central frequency by a frequency shift keying modulator, and the modulation device modulates the second signal by shifting the initial central frequency towards at least one frequency of the plurality of frequencies while respecting a distance between the two frequencies of the frequency shift keying modulation.

12. The circuit of claim 10, wherein the second signal is a binary data flow converted into a modulated signal in a form of samples of portions of a frequency by an amplitude shift keying modulator, and the modulation device modulates the second signal by shifting the frequency of the amplitude shift keying modulator towards at least one frequency of the plurality of frequencies.

13. The circuit of claim 10, wherein the selection device provides the at least one frequency to the modulation device, and the modulation device produces the modulated signal on each at least one frequency provided by the selection device.

14. The circuit of claim 13, wherein the modulation device includes:

a plurality of multipliers to receive the second signal and a respective frequency of each at least one frequency provided by the selection device and multiply the second signal by the respective frequency to produce a plurality of corresponding multiplier output signals; and a mixer, coupled to the plurality of multipliers, to receive and mix the plurality of corresponding multiplier output signals.

15. The circuit of claim 14, wherein the modulation device further includes:

a plurality of switches corresponding to each of the plurality of multipliers to receive each respective frequency and provide the respective frequency to the corresponding multiplier based upon the transmission channel selected by the selection device.

16. The circuit of claim 14, wherein the modulation device further includes:

a low-pass filter coupled to an output of the mixer to filter high frequencies from the output of the mixer and provide the modulated signal.

17. The circuit of claim 10, further comprising:

a second output terminal to transmit a demodulated signal to the first modem;

a demodulation device coupled to the first input terminal, the second output terminal, and the selection device, to receive a configuration signal from the selection device, demodulate the first signal according to the configuration signal, and produce the demodulated signal.

18. The circuit of claim 17, wherein the configuration signal is a single frequency of the plurality of frequencies that defines the transmission channel, and the demodulation device includes:

a first filter, coupled to the first input terminal and centered on the single frequency, to filter the first signal, and provide a first filtered signal;

a multiplier, coupled to the first filter, to receive the first filtered signal and demodulate the first filtered signal.

19. The circuit of claim 18, wherein:

the second signal is a binary data flow converted into a modulated signal in a form of samples of portions of two frequencies centered on an initial central frequency by a frequency shift keying modulator;

the modulation device modulates the second signal by shifting the initial central frequency towards at least one frequency of the plurality of frequencies while respecting a distance between the two frequencies of the frequency shift keying modulation; and an output of the multiplier is provided to a band-pass filter having a bandwidth corresponding to the distance between the two frequencies of the frequency shift keying modulation and which is centered on the initial frequency, to provide the demodulated signal.

20. The circuit of claim 17, wherein the selection device includes:

a phase-locked loop to provide a first frequency;

a frequency divider, coupled to the phase-locked loop, to receive the first frequency and divide the first frequency into the plurality of frequencies, the frequency divider providing the plurality of frequencies to the modulation device; and a switch, coupled to the frequency divider and the demodulation device, to receive a selection signal and provide the configuration signal to the demodulation device, the configuration signal being a single frequency of the plurality of frequencies provided to the modulation device.

21. The circuit of claim 20, wherein the selection device further includes:

a first integrator, coupled to a first transmission channel of the at least two transmission channels, to receive the communication beginning on the first transmission channel and determine the level of energy received on the first transmission channel;

a second integrator, coupled to a second transmission channel of the at least two transmission channels, to receive the communication beginning on the second transmission channel and determine the level of energy received on the second transmission channel; and a first comparator, coupled to an output of the first and the second integrator, to compare the level of energy received on the first and second integrators and provide a transmission signal that indicates the highest quality of transmission.

22. The circuit of claim 21, wherein the selection device further comprises:

a second comparator, coupled to the output of the first integrator and a threshold energy level, to compare the level of energy received on the first transmission channel, compare it to the threshold energy level, and produce a first threshold signal;

a third comparator, coupled to the output of the second integrator and the threshold energy level, to compare the level of energy received on the second transmission channel, compare it to the threshold energy level, and produce a second threshold signal; and a decoding circuit, coupled to an output of the first comparator, the second comparator and the third comparator, to provide the selection signal based upon the transmission signal and the first and second threshold signals.

23. A method of allocating a transmission channel to a communication between a first modem and a second modem using an electric network as a medium of transmission, the transmission channel being allocated from a plurality of transmission channels, each of the plurality of transmission channels being defined by a respective one of a plurality of frequencies, the method comprising the steps of:

initiating the communication simultaneously on at least two transmission channels of the plurality of transmission channels, receiving the communication on at least one transmission channel of the at least two transmission channels; and selecting the transmission channel to allocate to the communication according to a quality of transmission received on each of the at least two transmission channels;

wherein the step of selecting includes steps of:

integrating an energy level received on each of the at least two transmission channels to produce respective first and second energy level signals;

comparing the respective first and second energy level signals; and selecting a first of the at least two transmission channels as the transmission channel when a value of the first energy level signal is greater than a value of the second energy level signal, and selecting a second of the at least two transmission channels as the transmission channel when the value of the second energy level signal is greater than the value of the first energy level signal.

24. The method of claim 23, wherein the step of selecting further includes a step of selecting neither the first transmission channel nor the second transmission channel when the value of the first energy level and the value of the second energy level are less than a threshold value.

25. The method of claim 23, wherein the step of selecting is performed during a frame for establishing the communication between the first modem and the second modem.

26. The method of claim 23, wherein the step of selecting includes a step of determining the quality of transmission on each of the at least two transmission channels based upon an energy level of the communication received on each of the at least two transmission channels.

27. A method of allocating a transmission channel to a communication between a first modem and a second modem using an electric network as a medium of transmission, the transmission channel being allocated from a plurality of transmission channels, each of the plurality of transmission channels being defined by a respective one of a plurality of frequencies, the method comprising the steps of:

initiating the communication simultaneously on at least two transmission channels of the plurality of transmission channels;

receiving the communication on at least one transmission channel of the at least two transmission channels; and selecting the transmission channel to allocate to the communication according to a quality of transmission received on each of the at least two transmission channels;

wherein the communication is a binary data flow converted into a first modulated signal in a form of samples of portions of a first frequency by an amplitude shift keying modulator, and the step of initiating the communication includes steps of:

selecting at least one frequency from the plurality of frequencies on which to transmit the first modulated signal; and modulating the first modulated signal by shifting the first frequency of the amplitude shift keying modulator towards at least one frequency.

28. A method of allocating a transmission channel to a communication between a first modem and a second modem using an electric network as a medium of transmission, the transmission channel being allocated from a plurality of transmission channels, each of the plurality of transmission channels being defined by a respective one of a plurality of frequencies, the method comprising the steps of:

initiating the communication simultaneously on at least two transmission channels of the plurality of transmission channels;

receiving the communication on at least one transmission channel of the at least two transmission channels; and selecting the transmission channel to allocate to the communication according to a quality of transmission received on each of the at least two transmission channels;

wherein the communication is a binary data flow converted into a first modulated signal in a form of samples of portions of first and second frequencies centered on an initial central frequency by a frequency shift keying modulator, and the step of initiating the communication includes steps of:

selecting at least one frequency from the plurality of frequencies on which to transmit the first modulated signal; and modulating the first modulated signal by shifting the initial central frequency towards the at least one frequency while respecting a distance between the first and second frequencies of the frequency shift keying modulation.

29. A method of allocating a transmission channel to a communication between a first modem and a second modem using an electric network as a medium of transmission, the transmission channel being allocated from a plurality of transmission channels, each of the plurality of transmission channels being defined by a respective one of a plurality of frequencies, the method comprising the steps of:

initiating the communication simultaneously on at least two transmission channels of the plurality of transmission channels;

receiving the communication on at least one transmission channel of the at least two transmission channels; and selecting the transmission channel to allocate to the communication according to a quality of transmission received on each of the at least two transmission channels;

wherein the step of initiating includes step of:

generating at least two frequencies of the plurality of frequencies:

receiving a first signal from the first modem to transmit on the electric network;

modulating the first signal on the at least two frequencies to generate a modulated signal; and transmitting the modulated signal on the electric network.

30. The method of claim 29, wherein the step of modulating includes steps of:

respectively multiplying the first signal by each of the at least two frequencies to generate at least two multiplied first signals; and mixing the at least two multiplied signals to generate the modulated signal.

31. The method of claim 30, wherein the step of initiating further comprises a step of filtering the modulated signal prior to transmitting the modulated signal on the electric network.

32. The method of claim 29, further comprising steps of:

demodulating, responsive to the step of receiving and the step of selecting, the modulated signal to generate a demodulated signal; and transmitting the demodulated signal to the second modem.

33. The method of claim 29, further comprising steps of:

generating, responsive to the step of receiving and the step of selecting, a selection signal indicating which transmission channel of the at least two transmission channels is selected;

demodulating, based upon the selection signal, the modulated signal to generate a demodulated signal; and transmitting the demodulated signal to the second modem.

34. The method of claim 33, wherein the selection signal is a first frequency of the at least two frequencies that defines the transmission channel selected, and the step of demodulating includes a step of multiplying the modulated signal by the first frequency to generate the demodulated signal.

35. A circuit for allocating a transmission channel between a first modem and a second modem that communicate over an electric network, the transmission channel being allocated from a plurality of transmission channels that are each defined by a respective frequency of a plurality of frequencies, the circuit comprising:

means, coupled to the electric network, for transmitting a first communication simultaneously on at least two transmission channels of the plurality of transmission channels;

means, coupled to the electric network, for receiving a second communication on the at least two transmission channels; and means, coupled to the means for transmitting and the means for receiving, for selecting the transmission channel to allocate to the second communication based upon the transmission channel having a highest quality of transmission received on each of the at least two transmission channels;

wherein the means for selecting includes:

an energy level detector, coupled to the means for receiving, that detects an energy level of the second communication received on each of the at least two transmission channels; and a first comparator, coupled to the energy level detector, that compares the energy levels received on each of the at least two transmission channels and indicates which of the at least two transmission channels has a higher energy level.

36. The circuit of claim 35, wherein the means for selecting further includes:

a second comparator, coupled to the energy level detector, that compares the energy level received on a first transmission channel of the at least two transmission channels to a threshold value and indicates whether the energy level received on the first transmission channel is higher than the threshold value;

a third comparator, coupled to the energy level detector, that compares the energy level received on a second transmission channel of the at least two transmission channels to the threshold value and indicates whether the energy level received on the second transmission channel is higher than the threshold value; and a decoder, coupled to the first, second and third comparators, that selects the first transmission channel when the energy level received on the first transmission channel is higher than the energy level received on the second transmission level and higher than the threshold value, selects the second transmission channel when the energy level received on the second transmission channel is higher than the energy level received on the first transmission level and higher than the threshold value, and selects neither the first transmission channel nor the second transmission channel when the energy levels received on the first and second transmission channels are lower than the threshold value.

37. The circuit of claim 35, wherein the means for selecting includes means, coupled to the means for transmitting, for generating at least two frequencies of the plurality of frequencies, the at least two frequencies defining the at least two transmission channels.

38. The circuit of claim 37, wherein the means for transmitting includes means, coupled to the means for generating, for modulating the first communication on the at least two frequencies.

39. The circuit of claim 37, wherein the means for transmitting further includes means, coupled to the means for modulating, for filtering the first communication.

40. The circuit of claim 35, wherein the means for receiving includes means, coupled to the means for selecting, for demodulating the second communication.

41. The circuit of claim 35, wherein the means for receiving the second communication includes means for receiving the second communication simultaneously on the at least two transmission channels of the plurality of transmission channels.

42. A method of allocating a transmission channel to a communication between a first modem and a second modem, the transmission channel being allocated from a plurality of transmission channels, each of the plurality of transmission channels being defined by a respective one of a plurality of frequencies, the method comprising the steps of:

simultaneously receiving the communication on at least two transmission channels of the plurality of transmission channels;

comparing a quality of transmission of the communication received on each of the at least two transmission channels; and selecting the transmission channel having a highest quality of transmission received on each of the at least two transmission channels to allocate to the communication;

wherein the step of selecting includes a step of selecting the transmission channel having the highest quality of transmission received on each of the at least two transmission channels to allocate to the communication only when the quality of transmission received on at least one of the at least two transmission channels exceeds a threshold value.

43. The method of claim 42, wherein the steps of receiving, comparing and selecting are performed only at a beginning of the communication.

44. The method of claim 42, wherein the steps of receiving, comparing and selecting are performed at a beginning of the communication.

45. The method of claim 42, wherein the step of comparing includes a step of determining an energy level of the communication received on each of the at least two transmission channels.

46. A method of allocating a transmission channel to a communication between a first modem and a second modem, the transmission channel being allocated from a plurality of transmission channels, each of the plurality of transmission channels being defined by a respective one of a plurality of frequencies, the method comprising the steps of:

simultaneously receiving the communication on at least two transmission channels of the plurality of transmission channels;

comparing a quality of transmission of the communication received on each of the at least two transmission channels;

selecting the transmission channel having a highest quality of transmission received on each of the at least two transmission channels to allocate to the communication;

monitoring the communication on each transmission channel of the plurality of transmission channels transmitting the communication; and selecting a new transmission channel to allocate to the communication when a quality of transmission of one of the plurality of transmission channels exceeds the quality of transmission of the allocated transmission channel;

wherein the steps of receiving, comparing and selecting are performed at a beginning of the communication.

\* \* \* \* \*